(12) United States Patent
Satagopan et al.

(10) Patent No.: US 6,571,325 B1
(45) Date of Patent: May 27, 2003

(54) PIPELINED MEMORY CONTROLLER AND METHOD OF CONTROLLING ACCESS TO MEMORY DEVICES IN A MEMORY SYSTEM

(75) Inventors: Ramprasad Satagopan, San Jose, CA (US); Richard M. Barth, Palo Alto, CA (US)

(73) Assignee: Rambus Inc., Los Altos, CA (US)

( * ) Notice: Subject to any disclaimer, the term of this patent is extended or adjusted under 35 U.S.C. 154(b) by 0 days.

(21) Appl. No.: 09/401,977

(22) Filed: Sep. 23, 1999

(51) Int. Cl.$^7$ ............................................... G06F 12/00
(52) U.S. Cl. .................... 711/169; 711/5; 711/140; 365/230.03
(58) Field of Search .............................. 711/169, 5, 140, 711/167, 163, 152; 365/230.03, 230.04

(56) References Cited

U.S. PATENT DOCUMENTS

| | | | | | |
|---|---|---|---|---|---|
| 5,323,489 A | * | 6/1994 | Bird | ............................ | 711/167 |
| 5,732,243 A | * | 3/1998 | McMahan | .................... | 711/137 |
| 6,003,120 A | * | 12/1999 | Hardin | ........................ | 711/169 |
| 6,081,860 A | * | 6/2000 | Bridges et al. | ............. | 710/110 |

* cited by examiner

Primary Examiner—Matthew Kim
Assistant Examiner—Matthew D. Anderson
(74) Attorney, Agent, or Firm—Pennie & Edmonds LLP

(57) ABSTRACT

A memory controller for a high-performance memory system has a pipeline architecture for generating control commands which satisfy logical, timing, and physical constraints imposed on control commands by the memory system. The pipelined memory controller includes a bank state cache lookup for determining a memory bank state for a target memory bank to which a control command is addressed, and a hazard detector for determining when a memory bank does not have a proper memory bank state for receiving and processing the control command. The hazard detector stalls the operation of the control command until the memory bank is in a proper state for receiving and processing the control command. The memory controller also has a command sequencer which sequences control commands to satisfy logical constraints imposed by the memory system, and a timing coordinator to time the communication of the sequenced control commands to satisfy timing requirements imposed by the memory system. A physical layer manager in the memory controller insures that physical pins for the memory bus signal channels are available before communicating the timed and sequenced control commands to a target memory device in the memory system.

22 Claims, 9 Drawing Sheets

|   | STATE | DEVICE | OPEN ROW ADDRESS |
|---|-------|--------|------------------|
| 1 | STATE | DEVICE | OPEN ROW ADDRESS |
| 2 | STATE | DEVICE | OPEN ROW ADDRESS |
| 3 | STATE | DEVICE | OPEN ROW ADDRESS |
| • | STATE | DEVICE | OPEN ROW ADDRESS |
| • | STATE | DEVICE | OPEN ROW ADDRESS |
| • | STATE | DEVICE | OPEN ROW ADDRESS |

•
•
•

|   | STATE | DEVICE | OPEN ROW ADDRESS |
|---|-------|--------|------------------|
|   | STATE | DEVICE | OPEN ROW ADDRESS |
| • | STATE | DEVICE | OPEN ROW ADDRESS |
| • | STATE | DEVICE | OPEN ROW ADDRESS |
| • | STATE | DEVICE | OPEN ROW ADDRESS |
|   | STATE | DEVICE | OPEN ROW ADDRESS |
| N | STATE | DEVICE | OPEN ROW ADDRESS |

FIGURE 6

PIPELINED MEMORY CONTROLLER AND METHOD OF CONTROLLING ACCESS TO MEMORY DEVICES IN A MEMORY SYSTEM

BACKGROUND OF THE INVENTION

1. Field of the Invention

This invention pertains to the field of memory controllers, and more particularly, to a memory controller having a pipelined architecture for controlling access to memory devices in a memory system using an open-page policy, wherein memory pages within a memory device are not closed after each memory access.

2. Description of the Related Art

Typically, a semiconductor memory system comprises one or more memory devices connected by means of a bus to a memory controller which manages data flow to and from the memory devices. The memory devices may be dynamic random access memory (DRAM) devices, static random access memory (SRAM), etc.

FIG. 1 illustrates the organization of an exemplary memory device 100. The memory device 100 comprises a plurality of memory banks 110. Each memory bank 110 in turn comprises a plurality of memory pages 120 and each memory page 120 comprises a plurality of memory cells 130. The memory pages 120 within each memory bank 110 share a common pair of sense amplifier arrays 140 which are used to sense data stored within the memory cells 130 in the memory bank 110. The total number of memory cells 130 within a memory page 120 is referred to as the "page size."

The memory cells 130 within each memory page 120 are connected to each other by a word line which has a unique row address within a memory bank 110. Each memory cell 130 in a memory page 120 is connected to a separate bit line, each of which has a unique column address within the memory bank 110. Also, each memory cell 130 in a memory page 120 shares its bit line with corresponding memory cells 130 in all of the other memory pages 120 in the memory bank 110. Thus the memory cells 130 within a memory bank 110 are arranged in a matrix structure of rows and columns. Each memory cell 130 within a memory bank 110 is uniquely addressable by its word line position, or row address, and its bit line position, or column address. Accordingly, each memory cell 130 within a memory device 100 has a unique (memory bank+row+column) address.

Each memory cell 130 stores one bit of data. To access data stored in one or more "target" memory cells 130 within the memory device 100, the target memory page 120 wherein the target memory cells 130 are located is first "opened" by activating the corresponding word line for the target memory page 120. When the word line is activated, the data stored within all of the memory cells 130 connected to the activated word line are transferred via the bit lines to the sense amplifier array 140. From the sense amplifier array 140, the data from one or more target memory cells may be read from memory device 100 and communicated via the memory bus. After the memory access request is completed, each sense amplifier within the open target memory page 120 is then "precharged" to prepare the sense amplifier for a subsequent operation. This operation is said to "close" the target memory page 120.

As processor speeds increase, there exists a need for memory systems having faster and faster memory access speeds and data throughputs. Therefore high performance memory systems with new architectures are being implemented. One such architecture is the Direct Rambus™ memory architecture. A memory system according to the Direct Rambus™ memory architecture uses a narrow memory bus comprising a few signal channels (e.g., 30) connected device-to-device and operating at a very high clock rate to communicate memory access requests and data between a memory controller and one or more memory devices.

FIG. 2 shows such a memory system 200 wherein a plurality of memory devices 210 are connected to a memory controller 230 via a narrow, high-speed memory bus 220. The memory bus 220 comprises a small number of very high speed signal channels which carry address, data and memory access control information between the memory controller 230 and the memory devices 210. The memory system 200 uses a packetized signaling technology for the signal channels in the memory bus 220. The memory system 200 provides several advantages over traditional memory architectures, including a substantially reduced number of pins on the memory controller 230 and memory devices 210, and a higher sustained bandwidth for the memory bus 220.

A processor connected to the memory system 200 may access data stored in a target memory device 210 by communicating a memory access request to the memory controller 230. Within the memory system 200, memory access is effectuated by means of control packets communicated from the memory controller 230 to the target memory device 210, via one or more control signal channels in the memory bus 220. Data is communicated from the target memory device 210 by means of separate data packets communicated from the target memory device 210 via a separate data signal channel in the memory bus 220.

Within the memory system 200, control packets communicate control commands, including memory access commands (e.g., Activate, Precharge, Read, and Write commands) and memory maintenance commands (e.g. Refresh, and Power Down commands), from the memory controller 230 to a memory device 210. The control packets have predefined fields for control command type, memory address, and the like and are divided into row control packets and column control packets. Row control packets are communicated via a row control signal channel in the memory bus 220. Among other things, row control packets are used: to issue Activate commands to activate a word line and thereby to open a memory page within a memory device 210; to issue Precharge commands to precharge memory cells in an open memory page, and thereby close the open memory page, within a memory device 210; and to issue Refresh commands to refresh the data contents stored in memory cells within a memory device 210. Column control packets are communicated via a column control signal channel in the memory bus 220. Among other things, column control packets are used to issue Read commands and Write commands to one or more memory cells within the memory device 210.

The operations of opening and closing a memory page to access data stored within a memory device 210 require time for the associated control commands to be communicated via the memory bus 220, and require some time to be performed by the memory device 210. While a memory page is being opened or closed, the memory device 210 cannot provide data from memory cells in that memory page, or any other memory page, within its memory bank. Accordingly, the opening and closing operations consume bandwidth and can reduce the data throughput of the memory system 200.

In general, a memory system can implement either a "close-page" policy, where after each memory access request to memory cells in a memory page in a memory device, the corresponding memory page is closed, or an "open-page" policy, where the memory page is left open after a memory access request, until some other event necessitates closing it (e.g., a memory access request to another memory page within the memory bank).

"Locality" refers to the degree to which consecutive memory access requests are addressed to a same memory page within a memory system. The application(s) being performed by a processor issuing memory access requests to a memory system typically determine the degree of locality in memory access requests. In turn, the degree of locality in memory access requests in the memory system determines whether it is better to implement an open-page policy or a close-page policy.

If the pattern of memory access requests tends to be random (i.e., has a low degree of locality) then it is preferable to use a close-page policy. In that case, every memory access ends with all memory pages and memory banks closed and there is no need to check whether a memory page or memory.bank is open or closed before executing the next memory access request.

However, for certain other applications, where there is a high degree of locality in memory access patterns, it is preferable to use a memory system having an open-page policy, which leaves a memory page open after a memory access, and only closes it later when some subsequent event necessitates it. In that case, if a memory access request is addressed to the same memory page as the previous memory access request, the precharge operation for the first memory access request, and the activation operation for the second memory access request, can each be avoided. This increases the data throughput in the memory system.

The memory system described herein operates according to an open-page policy. As such, the memory system imposes a number of constraints which must be adhered to by the memory controller in generating and issuing control commands in response to memory access requests received from a processor. These constraints include logical constraints, timing constraints, and physical constraints which are each discussed in detail below.

Logical Constraints

As discussed above, a memory device may be partitioned into a number of memory banks. FIG. 3 shows an arrangement of memory banks 310 in a memory device 210 which may be used in the memory system.

In the memory device 210, adjacent memory banks 310 share a common sense amplifier array 320. This allows the memory device 210 to have more memory banks 310 within the same or similar die area. Since only one memory page within a memory bank 310 may be open at any given time, increasing the number of memory banks 310, reduces the number of memory page conflicts within the memory device, leading to higher performance, and also reducing the power consumed by the memory device.

At any time, a memory bank can have one of three logical memory bank states: closed, open, or locked.

A memory bank is closed when neither of its associated sense amplifier arrays contain the data from either the memory bank itself, or an adjacent memory bank sharing a sense amplifier array. Before data may be accessed from a closed memory bank, it must first be opened, together with a desired memory page, by an Activate command from the memory controller.

A memory bank is opened when data from memory cells in an open memory page have been transferred to one of its sense amplifier arrays by a previous Activate command.

When a memory bank is open, the memory controller can access data from the memory cells in the open memory page. However, if the memory controller wants to access data from another (closed) memory page within the open memory bank, the open memory bank must first be closed. The open memory bank is closed by the memory controller issuing a Precharge command addressed to the open memory page. Then, the memory bank is "reopened" to the desired memory page by a subsequent Activate command from the memory controller.

When a memory bank is open, its adjacent memory banks are unavailable because their common sense amplifier array is being used by the open memory bank 310. FIG. 3 illustrates one example of memory banks 310 (indicated by a ●) which can simultaneously be open within the memory device 210. Memory banks which are unavailable due to their common sense amplifier array being used by one or both adjacent open memory bank are said to be in a "locked" state. When it is desired to access data from a locked memory bank, the adjacent open memory bank(s) must first be closed to free up the shared sense amplifier array(s). This action places the locked memory bank in a closed state. Once closed, the memory bank may be opened, together with a desired memory page to access data.

From the above description, it can be seen that a memory system comprising one or more memory devices with memory banks sharing common sense amplifier arrays impose a number of logical constraints upon a memory controller issuing control commands to the memory device (s). That is, when issuing a control command to one or more target memory cells in a target memory bank, the memory controller must insure that the target memory bank has a memory bank state suitable to receive the control command. For example, a closed or locked target memory bank cannot properly receive and process a read command. The target memory bank must first be opened. Also, a read command may be issued to a target memory bank only after the target memory bank has been activated by an Activate command. As another ready example, the memory controller should issue a Precharge command to a memory bank only if the memory bank has been previously activated. Many such logical constraints exist.

Timing Constraints

As noted above, each control command requires some amount of time to be communicated via the memory bus, and the memory device requires some amount of time to execute each received control command. FIGS. 4A through 4F illustrate certain timing constraints or requirements for the memory system which must be satisfied by control commands issued by a memory controller.

FIG. 4A shows a "transaction pipeline" for control packets and data packets communicated via the memory bus to effectuate a memory access request in the memory system. The transaction pipeline comprises: row control packets communicated via a row control signal channel; column control packets communicated via a column control signal channel; and data packets communicated via a data signal channel, all separated in time.

FIG. 4B shows the transaction pipeline for a read transaction which effectuates a read memory access request received by the memory controller from a processor, for example. In this particular case, the memory controller issues a row control packet comprising an Activate command, followed by one or more column control packets comprising a Read memory access request. Data then appears on the data signal channel in the memory bus some y cycles (e.g., eight cycles) later. Wherever possible, the memory controller uses unoccupied time on the control signal channels to issue further control commands to effectuate other memory access requests and operations, thereby increasing data throughput.

FIG. 4C shows the transaction pipeline for a write transaction effectuating a Write memory access request. The write transaction is similar to the read transaction shown in FIG. 4B, except that in the case of a write transaction, the data packet(s) appears on the data signal channel in the memory bus z cycles (e.g., six cycles) after the column control packet, rather than y cycles as in the read transaction.

FIG. 4D shows the transaction pipeline for back to back read transactions. The control packets should be pipelined as tightly as possible to increase data throughput on the data signal channel of the memory bus. Write-write transactions differ from read-read transactions only in the time interval between when the control packets are communicated and when the data packets appear on the data signal channel in the memory bus. The data packets appear on the data signal channel z cycles after the write control packet in a write-write transaction, versus y cycles in the case of a read-read operation.

FIG. 4E shows the transaction pipeline for back to back read-write transactions. Due to timing differences on the memory bus between read and write transactions, a gap of $|z-y|$ packets must be provided by the memory controller between the column control packets in order for the two transactions to produce full utilization of the data signal channel in the memory bus.

FIG. 4F shows the transaction pipeline for back to back write-read transactions. In this case, the column control packets can be tightly packed, however this results in a gap appearing between data packets on the data signal channel due to timing differences between the write and read transactions.

Inspection of FIGS. 4A–4F shows that the memory system imposes timing constraints upon control packets issued by a memory controller. Each control command requires a certain amount of time to be communicated to and executed by a target memory device. For proper operation, a control command should only be issued when the target memory device is known to be in a state suitable to receive this control command, and only after the memory device has completed all previous control commands which may affect the proper execution of the present control command.

For example, when a memory device receives an Activate command for a particular memory page in a memory bank, the memory device requires a minimum time period (e.g., 20 nsec.) to activate the memory bank before the memory device can properly process a subsequent Read control command directed to the same memory bank. Similarly, when a memory device receives a Precharge command to precharge a memory page in a memory bank, it requires a minimum period of time to perform the precharge operation before it can properly receive and process another precharge operation for a different memory page in the same memory device. Therefore, the memory controller must insure that it coordinates the timing of all control commands which it issues to insure that they can be properly processed by the target memory device.

Physical Constraints

As discussed above, the memory system operates according to a packetized protocol with control packets and data packets. The memory bus thus comprises a column control signal channel for communicating column control packets, a row control signal channel for communicating row control packets, and a data signal channel for communicating data packets. These signal channels each have an associated set of physical pins on the memory controller and memory devices. Other pins on these devices are used for clock signals, initialization signals, and power/ground. Each control command occupies a set of signal channels and associated physical pins for a certain period of time. The memory controller may not issue another control command which would use the same signal channel and physical pins during the same time period.

The control and data signal channels also have interdependencies wherein when a control command is issued on a control signal channel, physical pins associated with the data signal channel are then occupied for a specified period of time. For example, after a Read command is issued by a memory controller to a target memory device, the target memory device drives the data signal channel, and occupies the associated physical pins, for a specified period of time.

This is but one example of many physical constraints that are imposed on memory controller operation by the memory bus and related resources.

Accordingly, it would be advantageous to provide a memory controller for use in a high performance memory system which issues control commands satisfying logical constraints, timing constraints, and physical constraints for the memory system. It would also be advantageous to provide a memory controller well suited to processing applications with a high degree of locality in memory access patterns.

SUMMARY OF THE INVENTION

The present invention comprises a pipelined memory controller for a high performance memory system.

In one aspect of the invention, a pipelined memory controller checks and resolves all logical, timing and physical constraints on a memory access command before issuing the command. The pipelined memory controller isolates and resolves logical, timing, and physical constraint checks separately in two pipelined stages.

In another aspect of the invention, a pipelined memory controller controls memory access to memory devices in a memory system with a parallelized memory bus having a small number of very high speed signal channels which carry address, data and control information between the pipelined memory controller and the memory devices. Preferably, the memory system uses a packetized signaling technology for the signal channels in the memory bus.

In yet another aspect of the invention, a pipelined memory controller implements an open-page policy which improves memory access efficiency for applications with a high degree of memory access locality.

BRIEF DESCRIPTION OF THE DRAWINGS

FIG. 6 illustrates a preferred embodiment of a bank state cache for a pipelined memory controller.

DESCRIPTION OF THE PREFERRED EMBODIMENTS

The present invention provides a pipelined memory controller which addresses the logical, timing, and physical constraints discussed above. In one aspect, the present invention is well adapted for incorporation in emerging high speed memory systems. The assignee of the present invention has pioneered the development of next generation memory systems having a relatively narrow, high speed bus(es) and associated memory devices, along with the interface technology required to provide high data throughput. See, U.S. Pat. Nos. 5,319,755; 5,243,703; and 5,254,883, the disclosures of which are incorporated herein by reference.

In addition to the referenced U.S. Patents, information describing the assignee's memory systems and memory devices may be had at Rambus™ Inc., Mountain View, Calif. See, for example, the Direct RDRAM™ 64/72-Mbit Data Sheet, the Direct RAC Data Sheet, the Direct RMC.d1 Data Sheet, A Logical View of the Direct Rambus Architecture, Direct Rambus Technology Overview, Direct Rambus Clock Generator Source Sheet, Direct Rambus RIMM™ Module Data Sheet, the Direct Rambus Memory controller Summary, all 1998 documents and all incorporated herein by reference.

Figure 1:
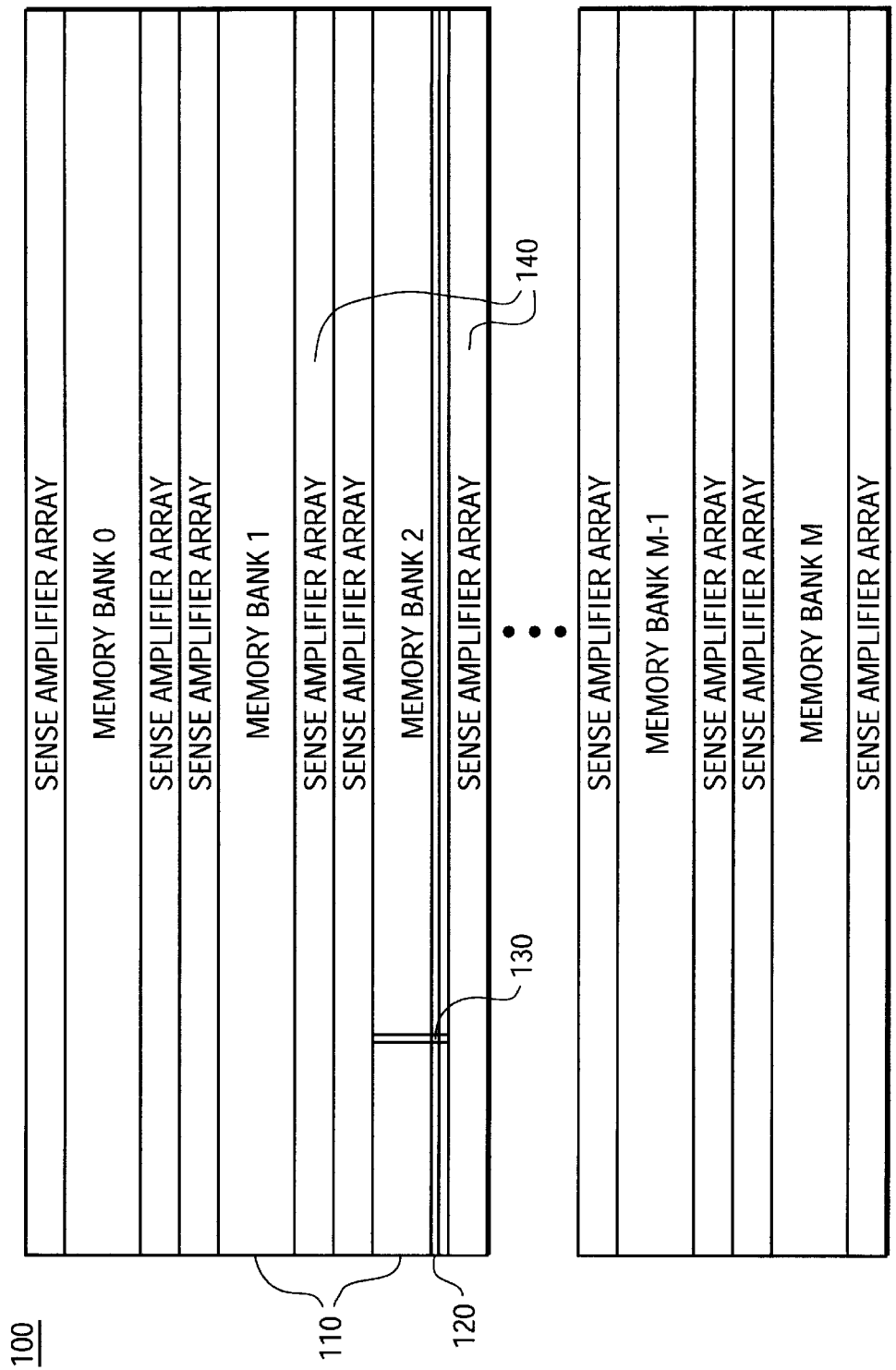
FIG. 1 shows an arrangement of memory cells within a memory device.
Figure 2:
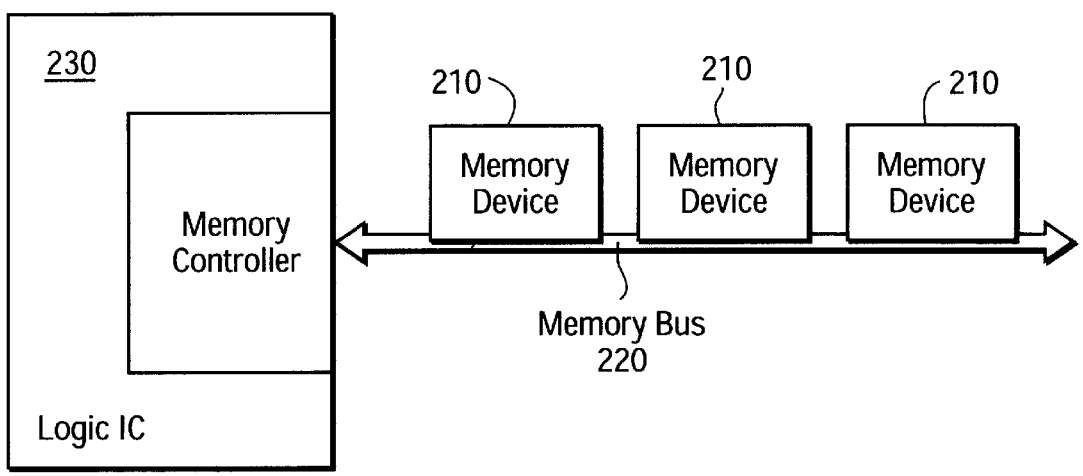
FIG. 2 is a block diagram of a memory system wherein a pipelined memory controller according to one or more aspects of the present invention may operate.
Figure 3:
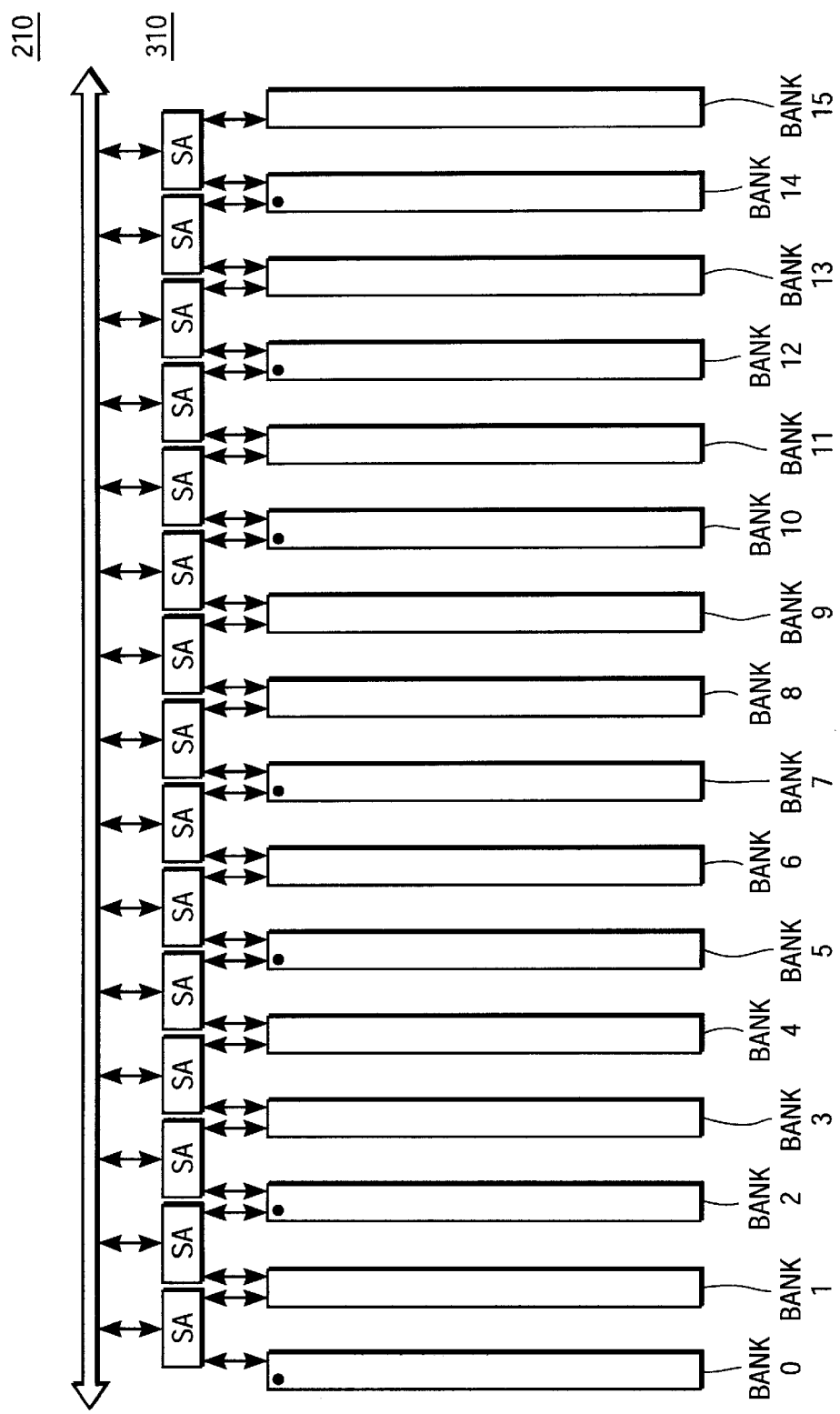
FIG. 3 shows an arrangement of memory banks in a memory device which may be used in a memory system with a pipelined memory controller according to one or more aspects of the present invention.
Figure 4A:
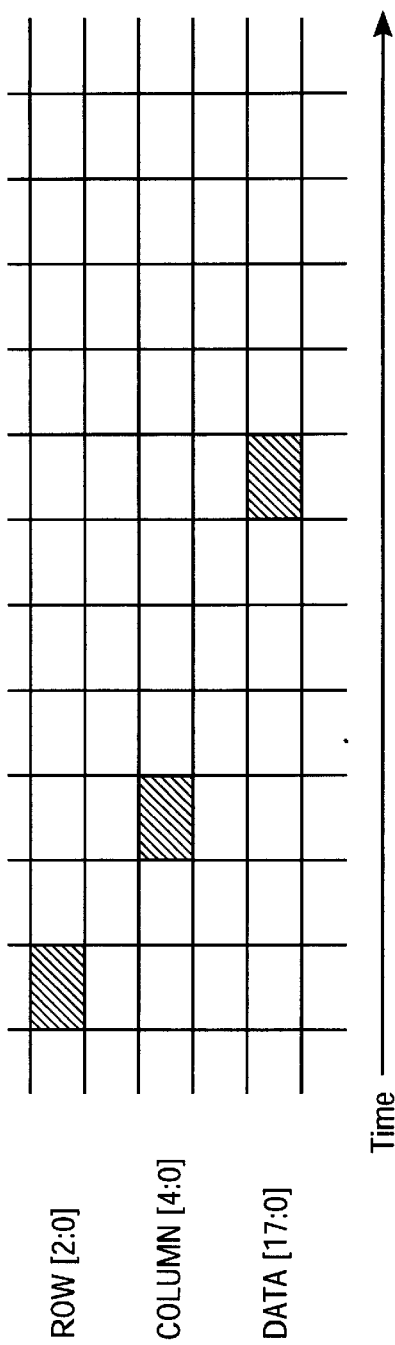
FIGS. 4A–4F shows a transaction pipeline in a memory system wherein a pipelined memory controller according to one or more aspects of the present invention may operate.
Figure 4B:
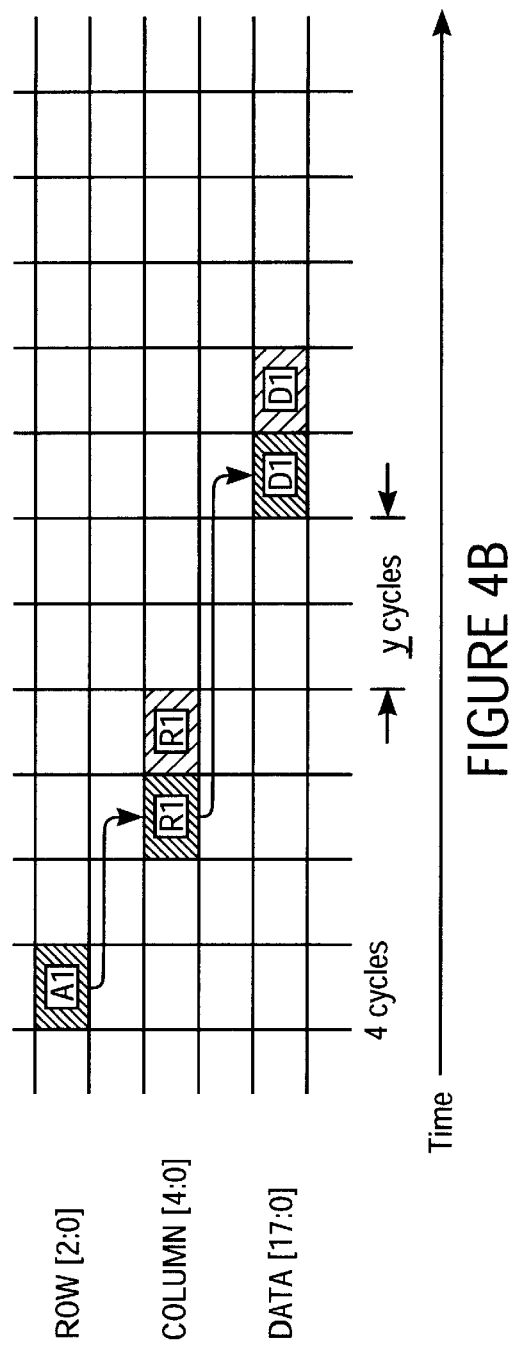
Figure 4C:
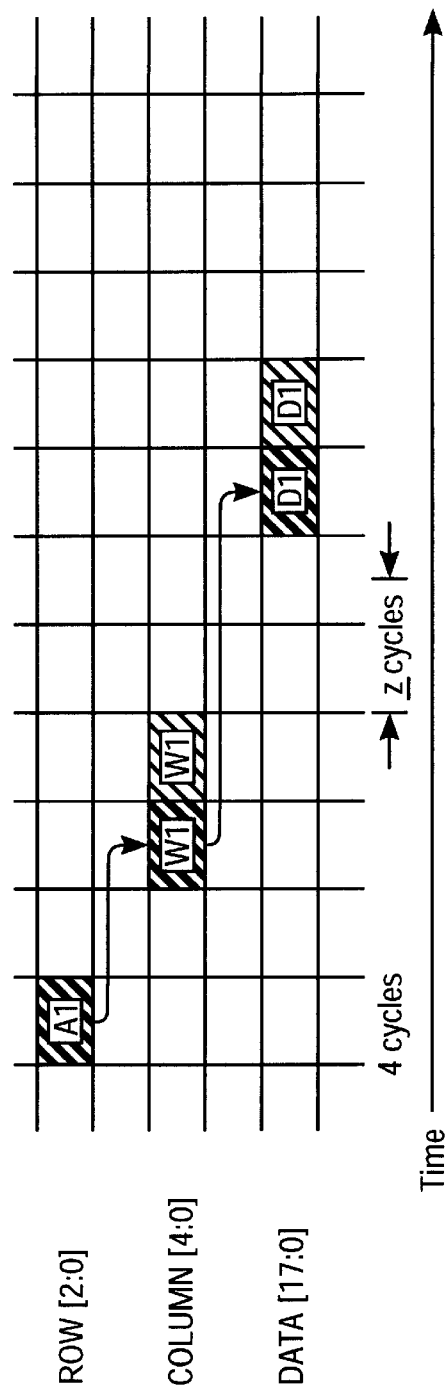
Figure 4D:
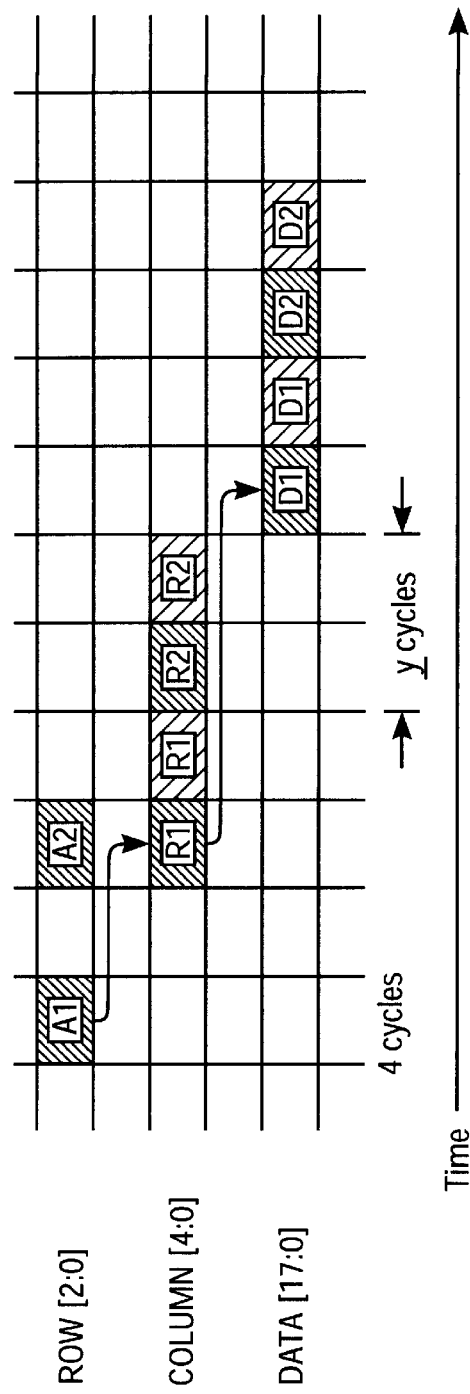
Figure 4E:
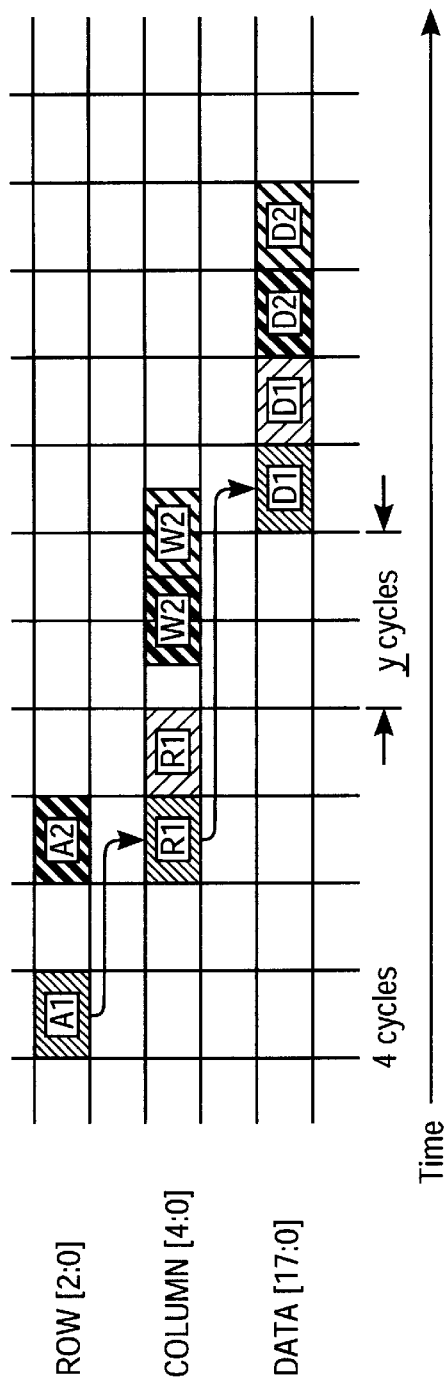
Figure 4F:
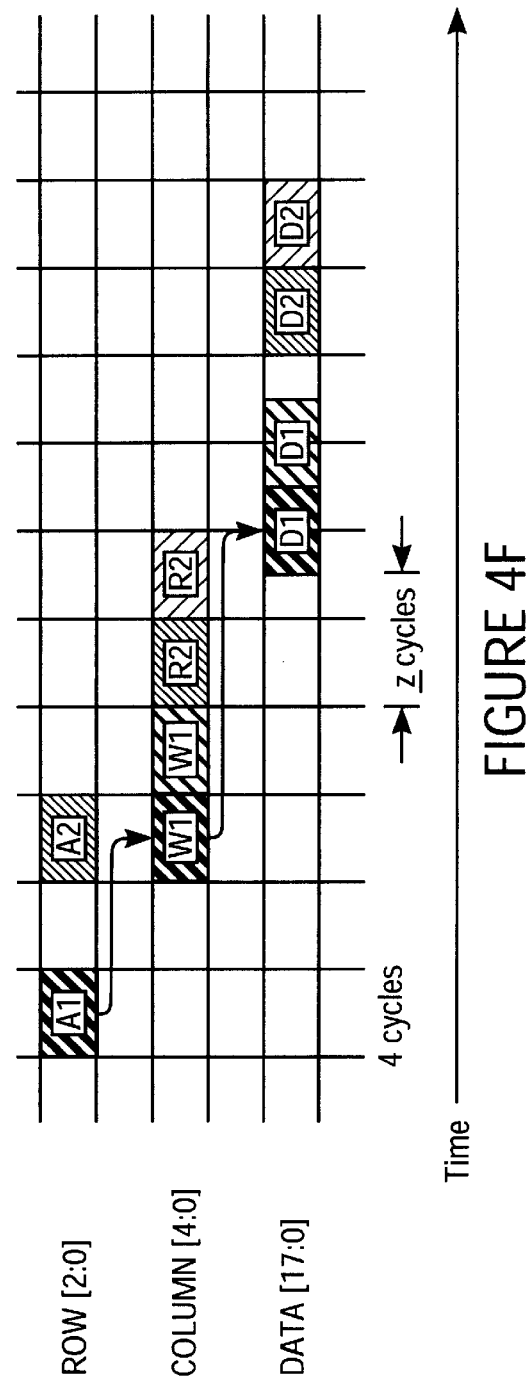
Figure 5:
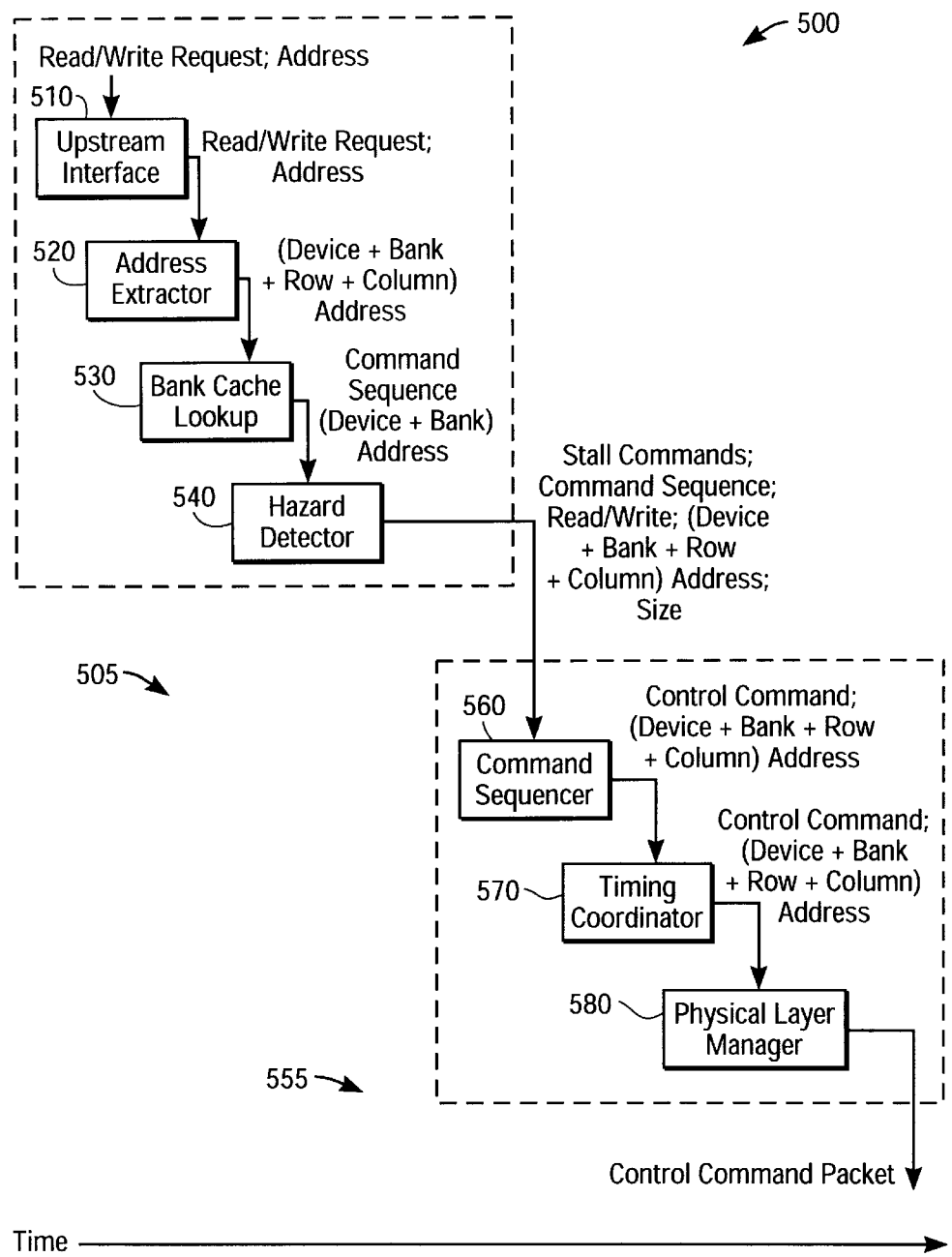
FIG. 5 is a functional block diagram illustrating an architecture for a pipelined memory controller according to one or more aspects of the present invention.

Turning specifically to the present invention, FIG. 5 is a functional block diagram illustrating an architecture for a pipelined memory controller 500 which generates and issues control commands to memory devices. The pipelined memory controller 500 may operate as the memory controller 230 shown in the memory system 200 of FIG. 2. In this case, the pipelined memory controller 500 receives memory access requests from one or more processors, and generates control commands which it issues to target memory devices 210 in the memory system 200 to satisfy the memory access requests.

The pipelined memory controller 500 comprises two pipeline stages 505 and 555 for insuring that each control command issued by the pipelined memory controller 500 satisfies all logical, timing, and physical constraints for the memory system 200.

The first pipeline stage 505 comprises an upstream interface 510, an address extractor 520, a bank state cache lookup 530, and a hazard detector 540. The first pipeline stage 505 generates and supplies control command information to the second pipeline stage 555 which comprises a command sequencer 560, a timing coordinator 570, and a physical constraint checker 580. The first pipeline stage 505 insures that each control command issued by the pipelined memory controller 500 satisfies all logical constraints for the memory system 200. The second pipeline stage 555 generates the control commands, insuring first that each control command satisfies all timing constraints for the memory system 200. The second pipeline stage 555 then frames the control commands into control packets, and performs checks to insure that the physical constraints for the control signal channels and data signal channel in the memory bus are satisfied before communicating the control packet via the memory bus. Each functional block in the pipelined memory controller 500 will be discussed more fully below.

Upstream Interface

The upstream interface 510 interfaces with and receives memory access requests from one or more processors which access the memory system through the pipelined memory controller 500.

The pipelined memory controller 500 may be implemented as one component in a larger logic integrated circuit (IC), in which case the pipelined memory controller 500 will typically communicate with the rest of the IC through some kind of internal bus through the upstream interface 510. In that case, the upstream interface 510 will preferably include logic to implement a regular bus protocol involving start/stop, acknowledge type signals, which may include bus arbitration logic circuitry and chip select logic circuitry. The upstream interface 510 passes received memory access requests to the address extractor 520 to be processed by the pipelined memory controller 500.

Address Extractor

A memory access request received by the pipelined memory controller 500 specifies a full n-bit wide memory address (e.g., n=32) for target memory cells to which the memory access request is addressed. However, within the memory system 200, each memory cell is addressed using a partitioned (memory device+memory bank+row+column) address, comprising a memory device address, a memory bank address, a row address and a column address. Accordingly, the address extractor 520 decodes the n-bit wide memory address into a partitioned (memory device+memory bank+row+column) address which may be used by the memory controller 500 to address the target memory cell(s). After the n-bit wide memory address is decoded into the (memory device+memory bank+row+column) address, the memory device address, a memory bank address, row address, and column address can all be separately provided to various component within the memory controller 500 which require them.

Bank State Cache Lookup

The pipelined memory controller 500 contains a bank state cache which tracks memory bank states for memory banks 310 within the memory devices 210 in the memory system 200.

FIG. 6 illustrates a preferred embodiment of a bank state cache 600. The bank state cache 600 has "N" entries 610 (e.g., N=32). In one embodiment, N may be equal to the number of memory banks 310 in the memory system 200, such that the bank state cache has an entry 610 for every memory bank 310 in the memory system 200.

Alternatively, for larger memory systems, multiple memory banks in the memory system may be mapped to each entry 610 in the back state cache 600. Preferably, each memory device in the memory system has a same number of memory banks, "M" (e.g., M=16), and each memory bank within the memory devices has a different memory bank number i, where i $\epsilon$(1, M).

Then, in a preferred embodiment, each entry 610 i in the bank state cache 600 corresponds to a specific memory bank in a memory device having the memory bank number i, where i $\epsilon$(1, M). The memory banks from two or more memory devices, having the same memory bank number i, all map to a same entry 610 i. Alternatively, the number of entries 610 in the bank state cache 600 may be greater than M, in which case the bank state cache 600 may have two or more entries 610 i1, 610 i2, etc, each corresponding to a same memory bank number i. In that case, the memory banks having the memory bank number i from one set of memory devices map to one entry 610 i1, and the memory banks having the memory bank number i from another set of memory devices map to another entry 610 i2.

An entry 610 i in the bank state cache 600 has three fields: a device field 612 identifying a memory device in the memory system to which the entry 610 i pertains; a memory bank state field 614 which comprises a single bit indicating whether the memory bank having the memory bank number i in the memory device is open or closed/locked; and a row address field 616 identifying a memory page which is open within the memory bank having the memory bank number i (if the memory bank number i within the memory device is open).

In the embodiment wherein multiple memory banks in the memory system are mapped to a same entry 610, all open memory banks in the memory system are identified in the bank state cache 600. However, an entry 610 i identifying an open memory bank is "retired" from the bank state cache 600 when another memory bank which maps to the same entry 610 i is activated. At that point, the memory cells in the open memory page in the open memory bank 310 identified by the entry 610 i are precharged, and the open memory bank is thereby closed.

Any memory bank which is not tracked by an entry in the bank state cache must be closed or locked. All memory banks are closed when they are retired from the bank state cache, but the memory bank may become locked due to a neighboring adjacent memory bank becoming open.

When the pipelined memory controller 500 receives a memory access request containing an n-bit wide memory address for one or more target memory cells, the address extractor 520 decodes the n-bit wide memory address and produces the memory device address for a target memory device, memory bank address for a target memory bank, and a row address for the target memory page. The address extractor provides these addresses to the bank state cache lookup 530.

The bank state cache lookup 530 looks up in the bank state cache 600 the memory bank state for the target memory bank in the target memory device, to determine whether the target memory bank is in an open or closed/locked state. If the target memory bank is open, then there is an entry 610 in the bank state cache corresponding to the target memory bank. In that case, the bank state cache reads the row address field 616 for the entry 610 corresponding to the target memory bank, identifying an open memory page in the target memory bank, and determines if the open memory page matches the target memory page for the memory access request.

If the target memory bank is closed/locked, the bank state cache lookup 530 also looks up in the bank state cache 600 the memory bank state for the memory banks which are adjacent to the target memory bank, to ascertain whether either of them is open. If either neighboring adjacent memory bank is open, then the target memory bank is locked; otherwise the target memory bank is closed.

Thus the bank state cache lookup 530 determines and outputs a memory bank state for a target memory bank to which a memory access request is directed.

Hazard Detector

When the pipelined memory controller 500 receives a memory access request for one or more target memory cells in a target memory device, the target memory cell(s) may be located in a target memory page which is open or closed. The target memory page may be located in a target memory bank which is open, closed, or locked. However, the target memory cell(s) cannot be accessed until the target memory bank and target memory page are both opened. A "hazard condition" is said to exist when there is a memory access request received for one or more target memory cells in a target memory bank with a memory bank state such that the target memory cells cannot currently be accessed. Several such hazard conditions exist, where a current memory access request needs to be stalled until a prior memory access request is completed.

For example, the pipelined memory controller 500 may receive a Read request for memory cells in a target memory bank which was locked by a previous memory access request. The hazard detector 540 will receive from the bank state cache lookup 530 the memory bank state (i.e., "locked") for the target memory bank. The hazard detector 540 detects this as a hazard condition for the Read request, and in response thereto issues a Stall command to the command sequencer 560 to stall generation of control commands for effectuating the Read request until the previous memory access request which locked the target memory bank is completed, and the target memory bank is closed. Preferably, at the same time, the hazard detector stalls any further memory access requests for the same target memory cells which are received from a memory accessing device, such as a processor, connected to the pipelined memory controller 500, until all logical constraints for the control commands for the Read request are resolved. Thus, command conflicts ripple up the pipeline to the top. This insures that all control commands satisfy all logical constraints for the memory system before they are issued by the pipelined memory controller 500.

The hazard detector 540 checks all such logical constraints for the memory system and issues Stall commands when necessary to insure that the pipelined memory controller 500 does not issue a control command which violates these logical constraints.

Command Sequencer

Memory access requests received by the memory system from a memory accessing device, such as a processor, arrive at the pipelined memory controller 500 in the form of Read/Write requests addressed to a group of one or more target memory cells. The command sequencer 560 receives these memory access requests, as well as any Stall commands from the hazard detector 540, and in response thereto generates and sequences control commands which effectuate the memory access requests.

In a preferred embodiment, the pipelined memory controller 500 issues control commands generated by the command sequencer 560 as row control packets, communicated from the pipelined memory controller 500 via the row control signal channel in the memory bus, and column control packets, communicated via the column control signal channel in the memory bus. Row control packets are used to communicate row control commands, such as Activate and Precharge commands. Column control packets are used to communicate column control commands, such as Read commands and Write commands. For every memory access request, the command sequencer 560 will generate one or more row control commands followed by a one or more column control commands, depending upon the number of target memory cells addressed in the memory access request.

In a preferred embodiment, in response to every Read command issued by the memory controller 500, a target memory page in a target memory bank in a target memory device 210 transfers up to 16 contiguous bytes of data onto the data signal channel of the memory bus. Accordingly, if a Read request is received by the memory controller 500, to read 64 contiguous bytes of data from a target memory page in a target memory bank in a target memory device, the command sequencer 560 will generate in response thereto an Activate command, including a (memory device+memory bank+row) address, for activating the target memory page, followed by four Read commands.

Several logical constraints must be satisfied before the command sequencer can issue a control command for a target memory bank. Each control command can only be issued if the target memory bank to which it is addressed has a memory bank state which is acceptable for properly receiving and processing the control command.

For example, when the command sequencer 560 receives a Stall command from the Hazard Detector 540 in connection with a Read request to a target memory bank, the command sequencer 560 will generate a Precharge command to close any open memory pages in the target memory bank and its neighboring adjacent memory banks left open by a previous memory access request, before generating the Activate command to the target memory bank. After activating the memory cells in the target memory page, the command sequencer 560 generates four Read commands, each Read command instructing the target memory device to transfer 16 contiguous bytes of data from the target memory page. The command sequencer 560 sequences all control commands to insure that they satisfy all such logical constraints for the memory system.

Thus, based on memory access requests received by the pipelined memory controller 500, and information from the bank cache lookup 530 and the hazard detector 540, the command sequencer 560 generates and sequences control commands to effectuate the memory access requests such that they satisfy all logical constraints for the memory system.

Timing Coordinator

A control command issued by the pipelined memory controller 500 may impose timing constraints upon subsequent control commands, depending upon the memory device and/or the memory bank to which the control commands are addressed. The timing coordinator 570 receives sequenced control commands from the command sequencer 560 and times the communication of each sequenced control command by the pipelined memory controller 500 via the memory bus to satisfy the timing requirements for the memory system.

Table 1 shows some exemplary timing requirements for an exemplary memory system into which the present invention may be readily adapted.

TABLE 1

| Constraint | Typical Value | Comments |
| --- | --- | --- |
| $T_{rcd}$ | 20 ns | Minimum time between an Activate command and a Read/Write command to the same memory page within a memory device. |
| $T_{rasmin}$ | 60 ns | Minimum time between an Activate command and a Precharge Command to the same memory page within a memory device. |
| $T_{ss}$ | 20 ns | Minimum time between an Activate command to one memory bank and a subsequent Activate command to a different memory bank within the same memory device. |
| $T_{pp}$ | 20 ns | Minimum time between a Precharge command to one memory bank and a subsequent Precharge command to a different memory bank within the same memory device. |
| $T_{rp}$ | 20 ns | Minimum time between a Precharge command and an Activate command to |

TABLE 1-continued

| Constraint | Typical Value | Comments |
| --- | --- | --- |
| | | the same memory bank within a memory device. |
| $T_{cas} + T_{cps}$ | 20 ns | Minimum time between a Read/Write command and a Precharge command to the same memory bank within a memory device. |

Figure 7:
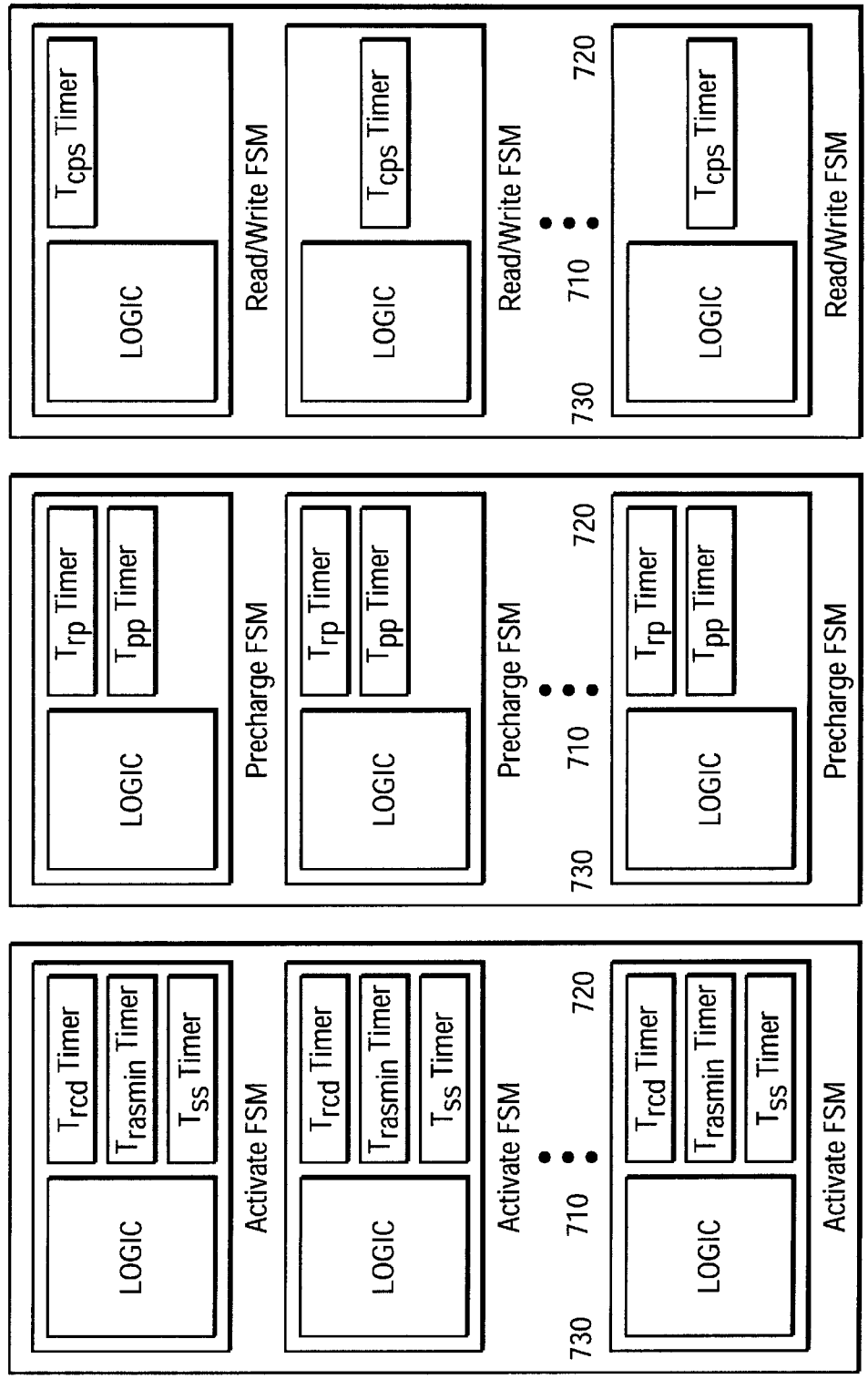
FIG. 7 shows a high level functional block diagram of a preferred embodiment of a timing coordinator for a pipelined memory controller.

FIG. 7 shows a high level functional block diagram of a preferred embodiment of the timing coordinator 570. The timing coordinator 570 includes finite state machines 710 with timers 720 and combinatorial logic 730 to simultaneously track timing requirements for a number of control commands which may simultaneously be in process by memory devices in the memory system. For example, in a preferred embodiment, it is possible to issue six Activate commands during the time period $T_{rasmin}$. In that case, six finite state machines 710 would be necessary to simultaneously track the timing requirements for each of the six Activate commands.

An example will now be described to help explain the operation of the timing coordinator 570. When the command sequencer 560 issues an Activate command to a memory page within a memory bank in a memory device, the timing coordinator 570 assigns a finite state machine 710 A to track timing requirements pertaining to the Activate command. The Activate command will include a (memory device+ memory bank+row) address, "D+B+R." The finite state machine 710 A in turn starts one or more timers 720 to track timing requirements for any control commands which follow the Activate command. For the exemplary set of timing requirements shown in Table 1, in response to the Activate command, the finite state machine 710 A starts a $T_{rcd}$ timer 720, a $T_{rasmin}$ timer 720, and a $T_{ss}$ timer 720. Each of the timers 720 runs for a period of time matching its corresponding timing requirement, as shown for example in Table 1. When the period of time has elapsed, the timer 720 clears or "times-out." When the command sequencer 560 issues a subsequent control command, the timing coordinator 570 checks whether the subsequent control command is addressed to the memory device "D" and the memory bank 310 "B" and if so, whether the appropriate timer 720 pertaining to the subsequent control command has cleared.

For example, if the subsequent control command is a Precharge command addressed to the memory device "D" and memory bank 310 "B,", then the timing coordinator 570 will check its finite state machines 710 to see if any of them are currently assigned to track timing requirements pertaining to the memory device "D" and memory bank "B." The timing coordinator 570 will determine that finite state machine 710 A was assigned to track timing requirements for the previous Activate command addressed to the memory device "D" and memory bank "B." Then, the timing coordinator 570 will determine that the $T_{rasmin}$ timer 720 pertains to the Precharge command. If the $T_{rasmin}$ timer 720 has not yet timed out, indicating that the timing requirement for the Precharge command has not yet been satisfied, then the timing coordinator 570 will hold the Precharge command. Once the $T_{rasmin}$ timer 720 does time out, indicating that the timing requirement has been satisfied, the timing coordinator will pass the timed and sequenced Precharge command to the physical layer manager 580.

Accordingly, the timing coordinator 570 times the communication of sequenced control commands via control signal channels in the memory bus and insures that all timing requirements for the memory system are satisfied before a control command is issued by the pipelined memory controller 500.

Physical Layer Manager

Once a control command has been checked to satisfy all logical constraints and timing constraints by the hazard detector 540, the command sequencer 560 and the timing coordinator 570, the timed and sequenced control command is ready to be issued in the form of one or more control packets communicated via the memory bus. The physical layer manager 580 receives timed and sequenced control commands, and frames the timed and sequenced control commands into row control packets and column control packets for communication via the memory bus.

In a preferred embodiment, the memory bus is comprised of three signal channels—a row control signal channel, a column control signal channel and a data signal channel, each having a dedicated set of physical pins on a circuit device incorporating the pipelined memory controller 500, and on each memory device 210. The physical layer manager 580 includes framing logic to frame each timed and sequenced control command into one or more control packets, using the (memory device+memory bank+row+column) address generated by the address extractor 520. For example, the physical layer manager 580 frames a timed and sequenced Activate command into an Activate control packet, a timed and sequenced Precharge command into a Precharge control packet, etc.

Each control packet occupies a control signal channel in the memory bus for a predetermined number of clock cycles (e.g., four clock cycles). Moreover, there are interdependencies between the control signal channels and the data signal channel in the memory bus which introduce physical constraints on the availability of signal channels, and associated physical pins, in the memory bus. These physical constraints must be resolved by the pipelined memory controller 500. For example, after the pipelined memory controller 500 issues a read control packet on the column control signal channel, the target memory device will drive the data signal channel for "X" clock cycles. The physical layer manager 580 checks all physical constraints for the communication of each control packet, and insures the availability of the appropriate signal channel and associated physical pins, before communicating the control packet to a target memory device via the memory bus.

The physical layer manager 580 also includes arbitration logic which arbitrates between control packets which are pending and ready for communication via the control signal channels.

In a preferred embodiment, the physical layer manager 580 prioritizes the communication of control packets via the control signal channels so as to increase the data throughput of the memory bus. For example, at some point in time there may be a pending Activate control packet and a pending Precharge control packet, each properly timed and sequenced, each addressed to a different memory device, and each waiting for the availability of a control signal channel for communication via the memory bus. In that case, the physical layer manager 580 may prioritize the Activate control packet and communicate it before communicating the Precharge control packet on the row control signal channel so as to increase the data throughput on the memory bus.

Thus, a pipelined memory controller according to the present invention uses a minimum number of pipelines stages to satisfy all logical, timing, and physical constraints for control commands in the memory system. Each of these constraints is eliminated in a successive pipelined stage of logic. A pipelined memory controller thus produced can implement an open-page policy in a memory system having memory devices with a large number of memory banks.

While preferred embodiments are disclosed herein, many variations are possible which remain within the concept and scope of the invention. For example, the number and type of control commands may vary from memory system to memory system. Also, the number and type of timing constraints which the pipelined memory controller must satisfy may vary from memory system to memory system. Such variations would become clear to one of ordinary skill in the art after inspection of the specification, drawings and claims herein. The invention therefore is not to be restricted except within the concept and scope of the appended claims.

What is claimed is:

1. In a memory system comprising:
    a pipelined memory controller receiving a memory access request, each memory access request including a memory address;
    a memory device; and,
    a memory bus connecting the memory controller and the memory device;
    wherein the memory controller further comprises:
        a first pipeline stage, comprising,
            an address extractor receiving the memory address in the memory access request and decoding from the memory address a memory bank address for a target memory bank in the memory device;
            a bank state cache lookup receiving the memory bank address and generating in response thereto a memory bank state for the target memory bank,
            a hazard detector receiving the memory access request and the memory bank state for the target memory bank, detecting hazard conditions for the memory access request, and in response to the detected hazard conditions, outputting stall commands; and
        a second pipeline stage, comprising,
            a command sequencer receiving the memory access request and the stall commands and in response thereto generating sequenced control commands for accessing the memory device,
            a timing coordinator receiving the sequenced control commands from the command sequencer, timing the sequenced control commands to satisfy memory system timing requirements, and generating timed and sequenced control commands, and
            a physical layer manager receiving the timed and sequenced control commands from the timing coordinator and communicating the timed and sequenced control commands via the memory bus to the memory device.

2. The pipelined memory controller of claim 1, wherein the physical layer manager frames the timed and sequenced control commands into control packets and communicates the control packets via the memory bus.

3. The pipelined memory controller of claim 1, wherein the memory bus comprises a row control channel and a column control channel, and wherein the physical layer manager communicates row control commands as row control packets via the row control channel, and communicates column control commands as column control packets via the column control channel.

4. The pipelined memory controller of claim 3, wherein the row control commands comprise activate commands and precharge commands, and the column control commands comprise read commands and write commands.

5. The pipelined memory controller of claim 1, further comprising an upstream interface for receiving the control commands from a processor.

6. The pipelined memory controller of claim 1, wherein in response to the bank state cache outputting a locked memory bank state for the target memory bank, the hazard detector detects a hazard and outputs a stall command.

7. The pipelined memory controller of claim 1, wherein in response to receiving a stall command, the command sequencer generates a precharge command to close an open memory bank in the memory device.

8. The pipelined memory controller of claim 1, wherein the timing coordinator comprises a plurality of finite state machines, each finite state machine tracking at least one timing requirement for one timed and sequenced control command.

9. The pipelined memory controller of claim 8, wherein each finite state machine comprises a timer being set by the one timed and sequenced control command and timing out when a time period corresponding to a timing requirement for the one timed and sequenced control command has elapsed.

10. A pipelined memory controller for receiving memory access requests and in response thereto controlling access to a memory device in a memory system, said memory device including memory banks sharing common sense amplifier arrays, comprising:

means for determinining logical constraints for each of the memory access requests and generating sequenced control commands which satisfy the logical constraints, said logical constraints including constraints resulting from the memory banks sharing common sense amplifier arrays;

means for timing the sequenced control commands to satisfy a plurality of timing constraints for the memory system, and producing timed and sequenced control commands; and means for communicating the timed and sequenced control commands to the memory device via the memory bus to effectuate the memory access requests.

11. The pipelined memory controller of claim 10, wherein the means for determining logical constraints for each of the memory access requests, comprises:

a bank state cache lookup for determining a memory bank state for a target memory bank for each memory access request;

a hazard detector for receiving the memory access requests and the memory bank state from the bank state cache, and for detecting hazard conditions comprising logical constraints for the memory access requests, and in response thereto outputting stall commands; and a command sequencer for receiving the memory access requests and the stall commands and in response thereto generating sequenced control commands which satisfy the logical constraints.

12. The pipelined memory controller of claim 10, wherein the means for determining logical constraints for each of the memory access requests comprises means for detecting a memory access request which is addressed to a locked memory bank in the memory device and in response thereto generating a stall command to close the locked memory bank.

13. The pipelined memory controller of claim 10, wherein means for timing the sequenced control commands comprises a timing controller.

14. The pipelined memory controller of claim 13, wherein the timing controller comprises a plurality of finite state machines, each finite state machine tracking at least one timing requirement for one timed and sequenced control command.

15. The pipelined memory controller of claim 14, wherein each finite state machine comprises a timer being set by the one timed and sequenced control command, and timing-out when a time period corresponding to a timing requirement for the one timed and sequenced control command has elapsed.

16. The pipelined memory controller of claim 10, wherein the means for communicating the timed and sequenced control commands comprises:

means for framing the timed and sequenced control commands into control packets; and means for determining an availability of control and data signal channels in the memory bus and in response thereto communicating the control packets via the control signal channels.

17. In a memory system comprising a memory device, a memory controller, and a memory bus connecting the memory device and the memory controller, said memory device including memory banks sharing common sense amplifier arrays, a method of generating control commands for controlling access to the memory device, comprising:

receiving at the memory controller memory access requests from a processor, each memory access request including a memory address;

determining logical constraints for each of the memory access requests, said logical constraints including constraints resulting from the memory banks sharing common sense amplifier arrays;

generating, in response to the memory access requests, sequenced control commands which satisfy the logical constraints;

timing the sequenced control commands to satisfy timing requirements for the memory system, to produce timed and sequenced control commands; and communicating the timed and sequenced control commands to the memory device via the memory bus to effectuate the memory access requests.

18. The method of claim 17, wherein determining logical constraints for each of the memory access requests, comprises:

decoding a memory bank address for a target memory bank from the memory address in each memory access request; and determining a memory bank state for the target memory bank.

19. The method of claim 17, wherein timing the sequenced control commands, comprises:

assigning a finite state machine to track at least one timing constraint for each control command.

20. The method of claim 17, wherein communicating the timed and sequenced control commands comprises:

framing the control commands into control packets;

communicating the control packets via control signal channels in the memory bus.

21. A pipelined memory controller for receiving memory access requests and in response thereto controlling access to a memory device in a memory system, comprising:

means for determining logical constraints for each of the memory access requests and generating sequenced control commands which satisfy the logical constraints, said means for determining logical constraints configured to generate a stall command to close a locked memory bank in the memory device when a memory access request is addressed to the locked memory bank;

means for timing the sequenced control commands to satisfy a plurality of timing constraints for the memory system, and producing timed and sequenced control commands; and means for communicating the timed and sequenced control commands to the memory device via the memory bus to effectuate the memory access requests.

22. In a memory system comprising a memory device, a memory controller, and a memory bus connecting the memory device and the memory controller, a method of generating control commands for controlling access to the memory device, comprising:

receiving at the memory controller memory access requests from a processor, each memory access request including a memory address;

determining logical constraints for each of the memory access requests, said determining step including issuing a stall command when a memory access request is addressed to a locked memory bank in the memory device;

generating, in response to the stall command when issued, a command to close the locked memory bank;

generating, in response to the memory access requests and after responding to the stall command when issued, sequenced control commands that satisfy the logical constraints;

timing the sequenced control commands to satisfy timing requirements for the memory system, to produce timed and sequenced control commands; and communicating the timed and sequenced control commands to the memory device via the memory bus to effectuate the memory access requests.

* * * * *